US006401856B1

(12) United States Patent
Kohlmorgen

(10) Patent No.: US 6,401,856 B1
(45) Date of Patent: Jun. 11, 2002

(54) METHOD AND DEVICE FOR THE POWER SHIFTABLE CHANGE-OVER OF A HYDROSTATIC VEHICLE DRIVE OF A MOBILE CONSTRUCTION MACHINE

(75) Inventor: Horst Kohlmorgen, Dortmund (DE)

(73) Assignee: O & K Orenstein & Koppel AG, Berlin (DE)

( * ) Notice: Subject to any disclaimer, the term of this patent is extended or adjusted under 35 U.S.C. 154(b) by 0 days.

(21) Appl. No.: 09/424,690
(22) PCT Filed: Feb. 9, 1999
(86) PCT No.: PCT/EP99/00823

§ 371 (c)(1),
(2), (4) Date: Nov. 29, 1999

(87) PCT Pub. No.: WO99/50575

PCT Pub. Date: Oct. 7, 1999

(30) Foreign Application Priority Data

Mar. 27, 1998 (DE) ......................................... 198 13 622

(51) Int. Cl.[7] ............................................... B60K 26/00
(52) U.S. Cl. ...................................... 180/307; 180/338
(58) Field of Search ................................ 180/305, 307, 180/338; 701/51, 52, 62, 56; 60/445

(56) References Cited

U.S. PATENT DOCUMENTS

| 3,890,783 A | * | 6/1975 | Allen et al. ................... 60/445 |
| 4,282,780 A | * | 8/1981 | Totani et al. .................. 701/51 |
| 4,380,278 A | * | 4/1983 | Lasken ........................ 701/62 |
| 4,523,494 A | * | 6/1985 | Sparks et al. ................ 180/338 |
| 5,177,964 A | * | 1/1993 | Tanaka et al. ................. 60/445 |
| 5,473,895 A | * | 12/1995 | Bausenhart et al. ........ 180/307 |
| 5,709,282 A | * | 1/1998 | Akira et al. ................. 180/307 |
| 5,761,628 A | * | 6/1998 | Steeby et al. .................. 701/51 |
| 5,819,866 A | * | 10/1998 | Smith et al. ................. 180/370 |
| 5,887,674 A | * | 3/1999 | Gray, Jr. ..................... 180/307 |
| 5,924,509 A | * | 7/1999 | Ferguson et al. ........... 180/307 |
| 5,995,896 A | * | 11/1999 | Depping et al. .............. 701/51 |

FOREIGN PATENT DOCUMENTS

| DE | 195 20 454 | * | 8/1996 | ............. E02F/9/20 |
| DE | 19547696 | * | 11/1996 | ............. E02F/9/20 |

* cited by examiner

Primary Examiner—Frank Vanaman
(74) Attorney, Agent, or Firm—Venable; Robert Kinberg; Chad C. Anderson

(57) ABSTRACT

A method for the power-shiftable change-over of a hydrostatic vehicle drive of a mobile construction machine, comprising at least one hydrostatic capacity pump, a hydrostatic drive motor and a two-stage power-shift transmission, which drives the axle(s) of the construction machine via its drive shaft, wherein the power-shift transmission is shifted with a change-over valve, which method is to be modified such that an operationally safe automatic change-over in dependence on the load is possible between the shifting stages of the power-shift transmission. This object is achieved by activating a switch (7), which causes at least two pressure switches (3, 4) that are operatively connected to at least one switching element (5) to be successively activated with different hydraulic contact pressures for the load-dependent automatic change-over of the power-shiftable transmission (1), wherein the switching element (5) is activated by one or the other pressure switch (3, 4) in dependence on preset load conditions in the hydraulic circuit and this switching element then electrically actuates the change-over valve (6) in order to effect the change-over of the power-shift transmission (1).

14 Claims, 2 Drawing Sheets

METHOD AND DEVICE FOR THE POWER SHIFTABLE CHANGE-OVER OF A HYDROSTATIC VEHICLE DRIVE OF A MOBILE CONSTRUCTION MACHINE

BACKGROUND OF THE INVENTION

The invention relates to a method for the power-shiftable changeover of a hydrostatic vehicle drive of a mobile construction machine, having at least one hydrostatic capacity pump, a preferably controlled hydrostatic drive motor and an at least two-stage power-shift transmission, which drives the axle(s) of the construction machine via its drive shaft, wherein the power shift transmission is shifted via at least one change-over valve, by means of pneumatic pressure, hydraulic pressure or electrical voltage.

The invention furthermore relates to a device for the power-shiftable change-over of a hydrostatic vehicle drive of a mobile construction machine, having at least one hydrostatic capacity pump, a preferably controlled hydrostatic drive motor and an at least two-stage power shift transmission, which drives the axle(s) of the construction machine via its drive shaft, wherein the power-shift transmission can be shifted via at least one change-over valve, by means of pneumatic pressure, hydraulic pressure or electrical voltage.

Mobile excavators or comparable construction machines, which have manually shiftable, two-stage spur-wheel drives in connection with a hydrostatic vehicle drive or which have only a hydrostatic vehicle drive (hydrostatic transmission) are known. The shifting occurs either through a manual shifting of the transmission by the driver or through automatic or manual shifting operations in the hydrostatic vehicle drive.

During the manual shifting of the transmission, it cannot be ruled out that the vehicle drive is not operated at the optimum shifting stage. In the most unfavorable case, this can even endanger the driving safety as well as the components of the construction machine, e.g. if a shifting to a low gear occurs at excessively high driving speeds.

German Patent 195 20 454 C1 from the assignee of the present invention discloses a method and a device for the load-dependent, automatic change-over of at least one two-stage hydraulic drive motor of a mobile construction machine. With this method and following the activation of a switch, at least two pressure switches that are operatively connected to a switching element are activated one after another with different hydraulic contact pressures. In the process, a valve that causes the drive motor to change over from its highest intake volume to its lowest intake volume and vice versa is electrically actuated by the change-over valve, which in turn is actuated by one or the other pressure switch in dependence on the preset load conditions in the hydraulic drive circuit. The known method therefore concerns an automatic change-over of a two-stage hydraulic drive motor, but does not concern a generic-type method of shifting a power-shift transmission.

It is the object of the invention to modify a method and a device of the generic type in such a way that an automatic and operationally safe change-over between stages of the power shift transmission in dependence on the load is possible, so that the total driving range from minimum to maximum speed can be traversed at different driving resistances without requiring a manual shifting. In addition, the driving safety is to be

BRIEF SUMMARY OF THE INVENTION

This object is solved according to the invention with a method of the aforementioned type, in that by actuating a switch, at least two pressure switches that are operatively connected to at least one switching element are actuated sequentially with different hydraulic contact pressures for a load-dependent automatic shifting of the power-shift transmission. In the process, the switching element is activated by one or the other pressure switch, in dependence on preset load conditions in the hydraulic driving circuit, and this switching element in turn electrically actuates the change-over valve to effect the shifting of the power transmission.

According to the invention, the driver thus can effect an automatic shifting by actuating a switch. In the process, a switching window is generated with the aid of two pressure switches and one relay (switching element) or similarly operating devices, which switching window permits on the one hand the automatic shifting in both directions (stage 1 following stage 2 and stage 2 following stage 1) and, on the other hand, prevents unnecessarily frequent shifting. The shifting occurs in dependence on the hydrostatic pressure in the driving circuit (maximum or minimum value).

In order to increase the driving safety and the safety of the machine components during the shifting, a particularly advantageous embodiment provides that the driving speed of the construction machine is monitored and a shifting back of the power-shift transmission is prevented if a preset speed value is exceeded. This can be achieved particularly advantageously in that a frequency signal that is proportional to the driving speed is evaluated by an evaluation unit in order to monitor the driving speed, and that a frequency-dependent switch is used to make possible or prevent the shifting.

An unproblematic shifting to a low shifting stage is therefore possible only in cases where the driving speed of the construction machine permits this without a problem. For this, a corresponding unit evaluates a driving-speed proportional frequency signal (tachometer signal). A shifting can occur only if the driving speed (frequency) is within a predetermined shifting window.

According to this method, it is furthermore preferably provided that the frequency-dependent switch acts upon the change-over valve. Alternatively, it can also be provided that the frequency-dependent switch acts upon an additional valve, which is arranged parallel to the change-over valve and is hydraulically connected to this valve.

In addition, it is advantageously provided that the shifting up of the power-shift transmission occurs exclusively by means of the pressure switches and depending on the load. For this, the frequency-dependent switch must be connected via suitable elements, e.g. relays, to the change-over valve, so as to program the frequency-dependent circuit in such a way that it is only effective for the shifting down.

It is furthermore advantageously provided that the driving speed of the construction machine is monitored and an automatic shifting back to the lowest gear of the power-shift transmission occurs if the construction machine is stopped. It makes sense to do this via the frequency-dependent switch, which makes it possible to determine whether the vehicle is stopped or not. An additional frequency-dependent switch can also be provided for this.

According to yet another advantageous embodiment, the lower contact pressure for the pressure switches is adjusted such that it corresponds to a pressure of the capacity pump in the range of its maximum pumping capacity.

The method furthermore provides that the upper contact pressure for the pressure switches is adjusted so as to be in the range of the maximum system pressure.

In order to solve the initially defined problem, the generic device according to the invention is distinguished by having a switch and at least two pressure switches with different hydraulic contact pressures for the load-dependent automatic shifting of a power-shift transmission, wherein the pressure switches are operatively connected to a switching element that is connected to the change-over valve and electrically actuates this change-over valve.

The switch is normally located in the driver cab of the construction machine and effects the selection between manual and automatic shifting. The switching element that is connected to the pressure switches can preferably be designed as a relay.

A particularly advantageous embodiment of the invention provides for an evaluation unit for monitoring the driving speed and a therewith connected, frequency-dependent switch, which permits or prevents the shifting of the power-shift transmission.

It is advantageous in this case if the frequency-dependent switch is operatively connected to the change-over valve. As an alternative, it can also be provided that the frequency-dependent switch is operatively connected to an additional valve, which is arranged parallel to the change-over valve and is hydraulically connected to it.

It is particularly advantageous if the frequency-dependent switch has a first output, which is operatively connected to the change-over valve by way of a relay. With the aid of this relay, it is possible for the frequency-dependent and thus also speed-dependent shifting to become effective only if the speed is reduced, meaning during the down-shifting of the power-shift transmission. This is designed to avoid a shifting up, which does not depend on the load. As a result, it is ensured that the shifting up occurs only in dependence on the load.

It is furthermore advantageously provided that the frequency-dependent switch has a second output, which is operatively connected via an additional relay to the change-over valve, wherein the additional relay is arranged between the change-over element and the switch as well as the relay. By providing this additional relay, it is possible to effect an automatic shifting to the first gear if the vehicle is stopped.

The frequency-dependent switch can have two outputs, as described in the above. Alternatively, it is also possible to provide two separate switches with respectively one output inplace of the frequency-dependent switch.

In place of the previously described individual components, it can also be provided that the pressure switches, the switching element, the frequency-dependent switch and the relays form a joint electronic, hydraulic or pneumatic switching logic.

BRIEF DESCRIPTION OF THE DRAWINGS

The invention is explained in the following in further detail with the aid of the drawing, which shows.

DETAILED DESCRIPTION OF THE INVENTION

Figure 1:
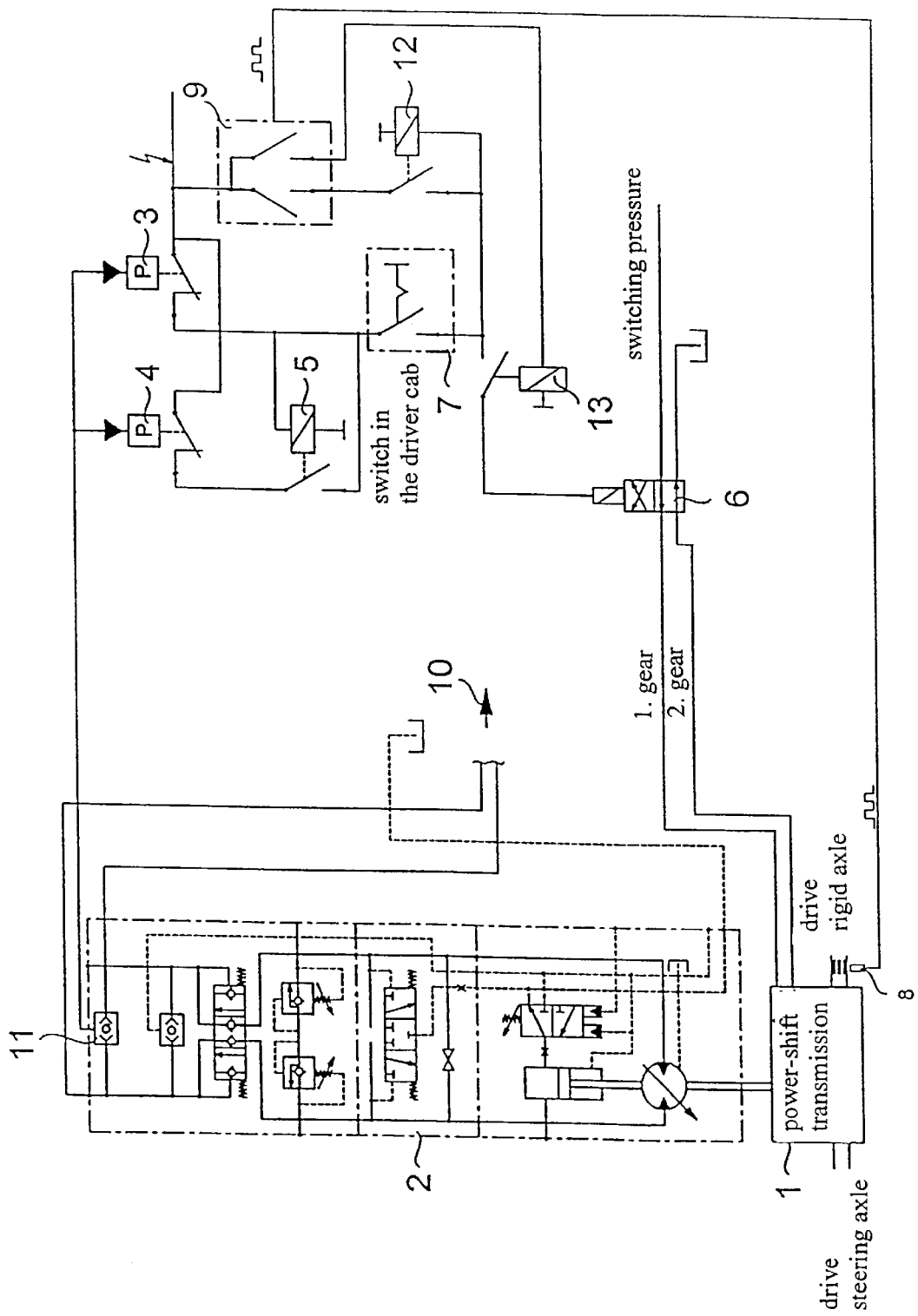
FIG. 1 A basic sketch of an operational diagram for the automatic shifting of a two-stage power-shift transmission for a hydrostatic vehicle drive of a mobile construction machine and FIG. 2 A flow diagram to demonstrate the shifting operations.

A hydrostatic vehicle drive of a mobile construction machine, shown as an example, has a driving circuit that is generally referred to as 2, 10, and a therewith connected power-shift transmission 1, which is shown with two stages in the exemplary embodiment, meaning it has a first and second gear. The power-shift transmission 1 comprises two drive axles serving as drive for the steering axle and drive for the rigid axle of the construction machine.

The driving circuit 2, 10 contains the standard elements, which are not discussed further in detail here. Not shown is a hydrostatic capacity pump, which is indicated only by an arrow 10. A hydraulic change-over valve 11 is arranged in the driving circuit 2, 10.

Two parallel pressure switches 3 and 4 are connected via this hydraulic changeover valve 11 to the driving circuit, which pressures switches serve as switching elements and have different hydraulic contact pressures. Both pressure switches 3 and 4 are designed as opening switches. The pressure switch 3 has a lower hydraulic contact pressure than the pressure switch 4. Both pressure switches 3 and 4 are connected to a switching element 5 that is preferably formed by a relay, as well as a switch 7 that is arranged in the driver cab of the construction machine. This switching arrangement acts upon a 4/2-way valve, which is called the change-over valve 6 in the following. This change-over valve 6 makes it possible to shift the power-shift transmission 1 from the first gear to the second gear and vice versa.

The switching arrangement furthermore comprises a frequency-dependent switch 9 that is connected to an initiator 8, which can be arranged in the area of the rigid axle of the construction machine or another output-side location on the transmission.

The frequency-dependent switch 9 has two outputs, wherein the first output is connected via a relay 12 to the change-over valve 6. The second output of the frequency-dependent switch 9 is connected via a relay 13 to the change-over valve 6, wherein the relay 13 is arranged in the driver cab, between the change-over valve 6 and the switch 7, as well as the relay 12 and the frequency-dependent switch 9. The function of these components is described in further detail in the following.

In the currentless idle position, shown herein, the change-over valve 6 with electrical pilot control is adjusted such that the first gear is engaged. In this condition, the two pressure switches 3 and 4 are closed. The switch 7 in the driver cab can be used to select between the automatic in the closed position and the fixedly secured first gear in the opened position.

Independent of the switch position 7, the additional relay 13 effects a change-over to the first gear by opening up when the construction machine is stopped. The "automatic" condition is described in the following:

The start-up from the stopped condition always occurs in first gear and is caused by the relay 13 that is open in the stopped condition. A shift to the $2^{nd}$ gear occurs for speeds exceeding 0, if necessary, in dependence on the load.

As long as the pressure in the $2^{nd}$ gear in the drive circuit 2, 10 is lower than the contact pressure of the pressure switch 3, both pressure switches 3 and 4 and the switching element 5 are closed and the vehicle remains in second gear. If the pressure in the driving circuit 2, 10 increases, wherein the respectively higher pressure in the driving circuit is applied via the change-over valve 11 to the pressure switches 3 and 4 in dependence on the driving direction, the pressure switch 3 opens up first, which does not yet have any effect. Once a correspondingly higher pressure has been reached, the pressure switch 4 then opens up as well. This causes the switching element 5 to open up, thus providing a signal for shifting to the first gear. The first gear is shifted by switching the change-over valve 6, but only if the frequency-dependent switch 9 is opened as well. The first switching output of switch 9 functions as opener if a predetermined, driving-speed dependent frequency signal from the initiator 8 falls below a threshold value. As a result, a dangerous shifting from a higher to a lower gear at impermissibly high driving speeds of the mobile construction machine can be prevented. In the same way, a manual shifting to the first gear is prevented as well.

The relay 12 is positioned in line with the first output of the frequency-dependent switch 9 and is electrically wired in such a way that a shifting from the first to the second gear occurs only in dependence on the load pressure in the driving circuit and not in dependence on the speed.

The hydraulic motor of driving circuit 2 is swung out during the pressure rise of $Q_{max}$ (internal control in the driving circuit 2, 10), whereas the pump 10 for its maximum capacity hyperbola is regulated back to a smaller pumping capacity.

For the same driving speed in first gear that existed in second gear prior to the shifting, the main pump (driving) returns again to a higher pumping capacity owing to the drop in hydraulic operating pressure, and the hydrostatic drive motor returns to a smaller intake volume.

In that case, nearly the same transmission output moment is transmitted to the axles despite the lower hydraulic operating pressure and the reduced intake volume of the hydraulic motor because of the changed transmission ratio.

With further increasing driving resistance, the transmission output moment can be increased up to the maximum rotational moment (transmission output), based on the driving force hyperbola (maximum capacity), through a higher operating pressure in the driving circuit 2, 10 and a higher intake volume of the hydraulic motor, wherein the driving speed drops accordingly.

If the driving resistance and thus the pressure in the driving circuit drop once more, the pressure switch 4 closes first. However, owing to the electrical wiring, this does not have any effect since the switching element 5 is still not supplied with current (machine remains in first gear). The switching element 5 is only supplied with electrical voltage and closes if the switching pressure for the pressure switch 3 is reached. As a result, the change-over valve 6 is switched and a shifting to the second transmission stage (second gear) takes place. The changed transmission ratio effects a higher pressure in the driving circuit, which in turn results in an adaptation of the intake volume of drive pump 10. If the driving resistance continues to drop further, the hydrostatic vehicle drive follows the drive power hyperbola for maximum drive capacity until the maximum speed is reached.

Figure 2:
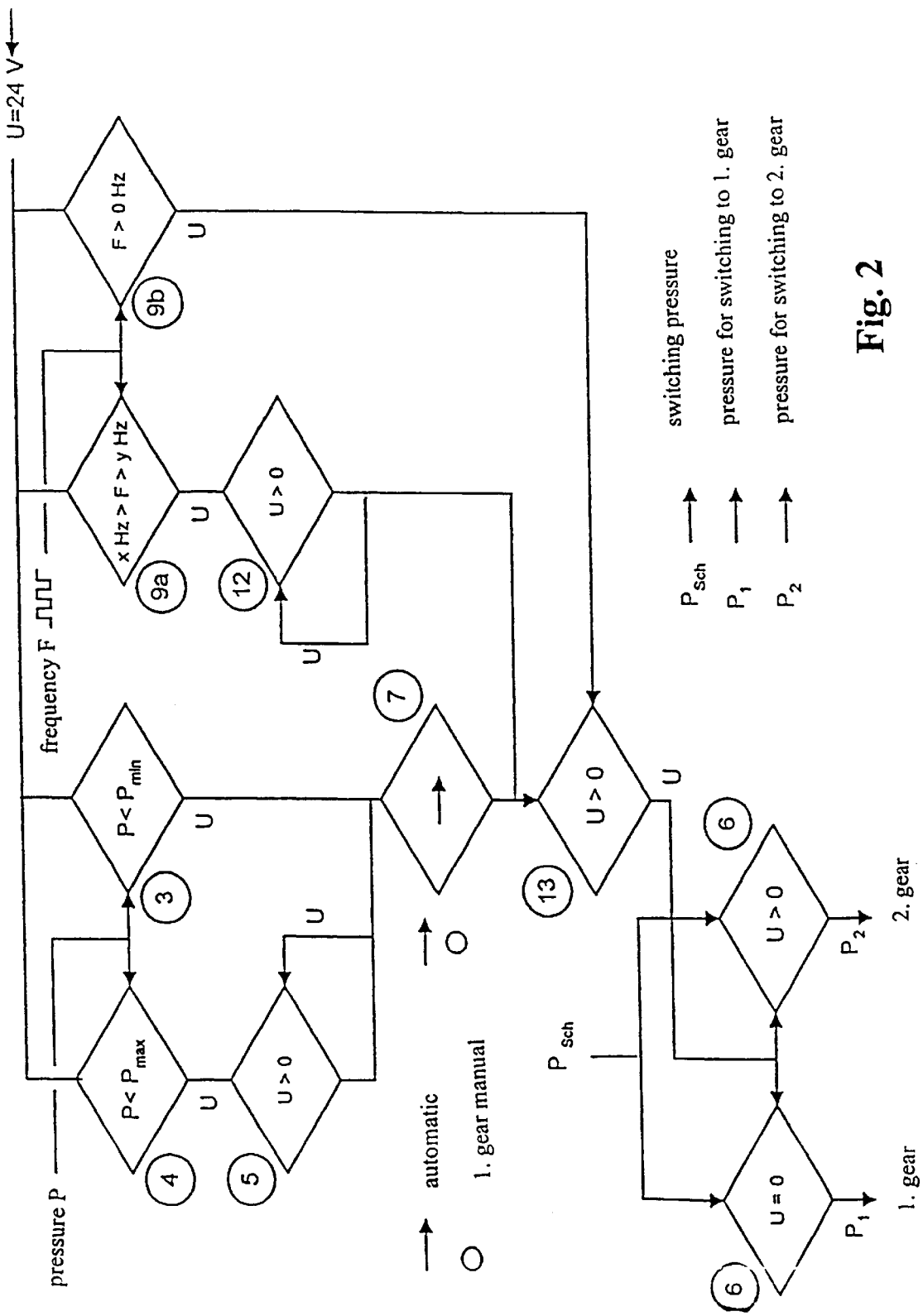

The above described operational sequence is also shown in the flow diagram for FIG. 2, from which the individual switching states follow more clearly. The same reference numbers were used as in FIG. 1, except that the first output of switch 9 is given the reference 9a and the second output the reference 9b. The standard references used are U for the voltage, F for the frequency and P for the pressure.

The following switching positions are respectively shown for the individual elements in FIGS. 1 and 2.

The pressure switch 3 is opened at a higher pressure, meaning no signal is transmitted to the switching element 5 and the switch 7. The pressure switch 3 is closed when the pressure is low, and a signal is transmitted to the switching element 5 and the switch 7.

The pressure switch 4 is closed below the maximum pressure $P_{max}$ and a voltage is present at the switching element 5.

The switching element 5 is opened while the power-shift transmission 1 is in first gear and closed while it is in second gear.

The switch 7 can be opened or closed manually. In the opened position, the first gear is fixed while in the closed position, the first or second gear is shifted automatically.

The switch 9 has two outputs for the exemplary embodiment shown. The voltage is interrupted if the first output 9a is open (switching window), resulting in a switching according to the logic for elements 3, 4, 5 and 7. If the first output is closed, a voltage is transmitted to the relay 12.

If the second output 9b of switch 9 is open (at frequency 0), no switching signal is present at the relay 13 (as shown). The second output 9b is closed at a frequency higher than 0, meaning that a switching signal is transmitted to the relay 13.

The relay 12 is open in the first gear and closed in the second gear.

If the additional relay 13 is open, the transmission is in first gear and when it is closed, the transmission is in first or second gear, depending on the position of elements 12, 7 and 5.

What is claimed is:

1. A method for a power shiftable change-over of a hydrostatic vehicle drive of a mobile construction machine with at least one axle, said vehicle drive having at least one controlled hydrostatic variable displacement pump, a hydrostatic drive motor, a hydraulic circuit, and a powershift transmission with at least two stages to propel the at least one axle of the construction machine, said hydrostatic drive motor comprising at least one of a fixed displacement hydrostatic drive motor and a variable displacement hydrostatic drive motor, wherein the transmission is shifted with at least one of pneumatic pressure, hydraulic pressure, and electric voltage and via at least one change-over valve, the method comprising:

activating a switch by the operator;

actuating a switching element with at least two pressure switches with differing contact pressures dependent on preset load conditions in the hydraulic circuit;

electrically actuating the change-over valve with the switching element;

activating a relay with an output of a vehicle speed monitoring frequency dependent switch, wherein the relay is closed by the frequency dependent switch at frequencies higher than zero to allow a shifting into second gear;

creating a voltage signal in a predetermined frequency window by another output of the frequency dependent switch and feeding the voltage signal via another relay in an operative connection of the switch and the relay to the change-over valve to actuate a shifting of the transmission.

2. The method according to claim 1, wherein the construction machine has a driving speed, and wherein the method further comprises monitoring the driving speed and preventing a shifting down of the transmission if a preset speed is exceeded.

3. The method according to claim 2, further comprising evaluating a frequency signal that is proportional to the driving speed with an evaluation unit, and at least one of preventing and enabling a switch-over using a frequency dependent switch.

4. The method according to claim 3, wherein, during the preventing and enabling step, the frequency dependent switch acts upon the change-over valve.

5. The method according to claim 3, wherein, during the preventing and enabling step, the frequency dependent switch acts upon an additional valve arranged parallel to the change-over valve and hydraulically connected to the change-over valve.

6. The method according to claim 3, wherein the actuating with at least two pressure switches step further comprises shifting up the transmission exclusively dependent on load.

7. The method according to claim 1, wherein the construction machine has a driving speed, and wherein the method further comprises monitoring the driving speed and automatically shifting the transmission having a lowest gear to the lowest gear if the machine is stopped.

8. The method according to claim 1, wherein the pump has a pressure and a maximum pumping capacity, and wherein the method further comprises adjusting the contact pressure of the pressure switch with a lower contact pressure to correspond to the pressure of the pump in a range of the maximum pumping capacity.

9. The method according to claim 1, wherein the machine has a maximum system pressure, and wherein the method further comprises adjusting the contact pressure of the pressure switch with a higher contact pressure in a range of the maximum system pressure.

10. A device for a power-shiftable, load-dependent change-over of a hydrostatic vehicle drive of a mobile construction vehicle with at least one axle, said vehicle drive having at least one hydrostatic capacity pump, a hydrostatic drive motor, an at least two-stage power shift transmission with a first gear and a second gear, a hydraulic circuit, and a drive shaft driving the at least one axle, wherein said transmission is shiftable with at least one of pneumatic pressure, hydraulic pressure, and electrical voltage and via at least one change-over valve, said device comprising:

a first switch activatable by an operator;

at least two pressure switches with different hydraulic contact pressures indicating different load conditions on the drive motor;

a switching element operatively connected to the pressure switches, the pressure switches actuating the switching element depending on preset load conditions in the hydraulic circuit;

a change-over valve operatively connected to and electronically actuated by the switching element;

a first relay and a second relay; and a frequency-dependent switch having a first output operatively connected via the first relay to the change-over valve, said frequency dependent switch having a second output operatively connected via the second relay to the change-over valve, said second relay being arranged between the change-over valve, the first switch, and the first relay, said second relay being activated by said second output of the frequency-dependent switch that closes said second relay at frequencies higher than zero to allow a shifting into the second gear, and said first output of said frequency-dependent switch creating a voltage signal in a predetermined frequency widow fed via the first relay to the change-over valve to activate a shifting of the power-shift transmission.

11. The device according to claim 10, wherein the vehicle has a driving speed, and wherein the device further comprises an evaluation unit for monitoring the driving speed operatively connected to the frequency dependent switch, wherein the frequency dependent switch is adapted to permit and prevent a change-over of the transmission.

12. The device according to claim 11, further comprising an additional valve operatively connected to the frequency-dependent switch, said additional valve being arranged parallel to and hydraulically connected to the change-over valve.

13. The device according to claim 10, wherein the frequency-dependent switch comprises two separate switches, each with one output.

14. The device according to claim 10, wherein the pressure switches, the switching element, the frequency dependent switch, and the first and second relays are designed to form one of a common electronic switching logic, hydraulic switching logic, and pneumatic switching logic.

* * * * *